Figure 1:
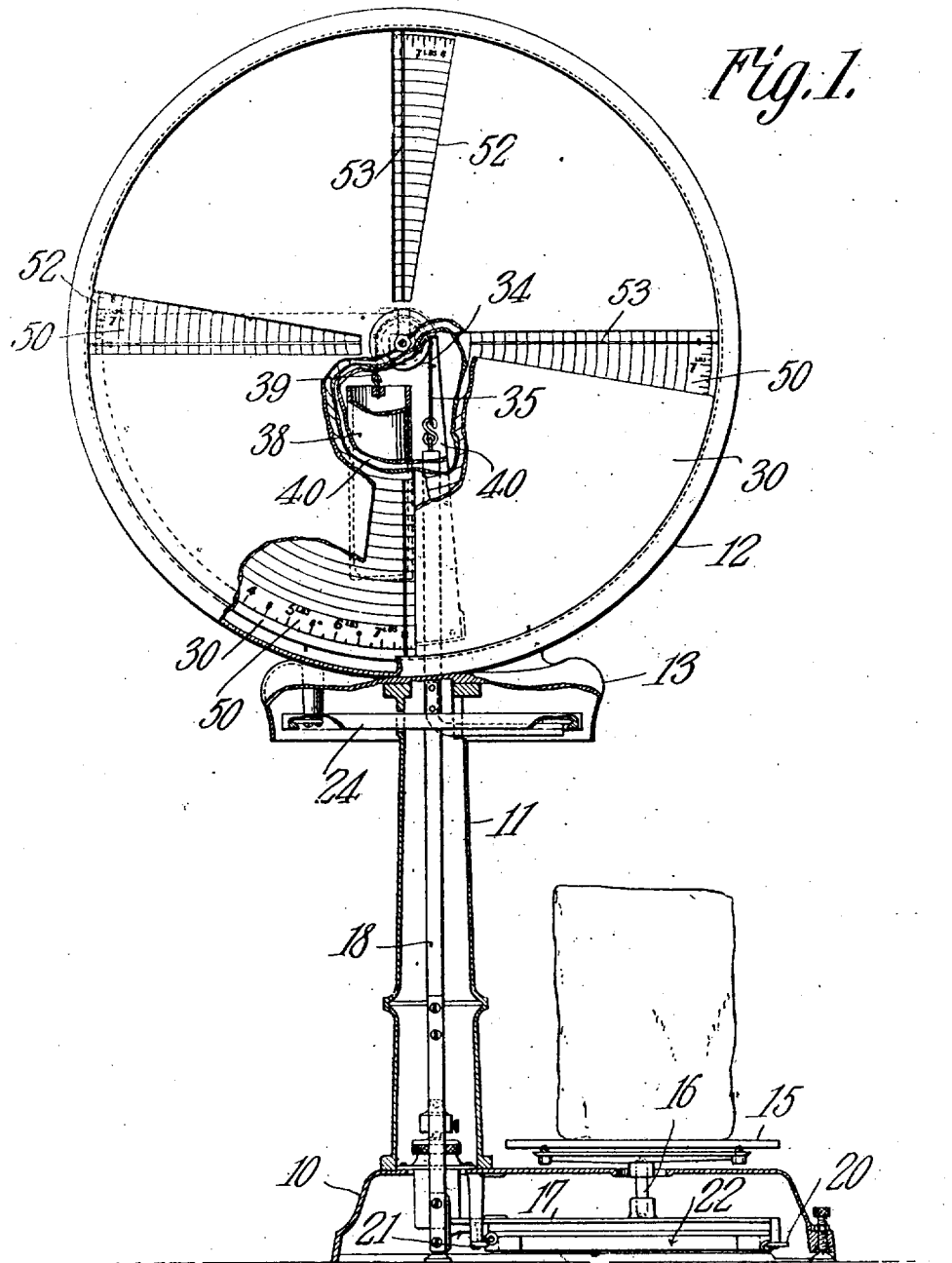

No. 892,773. PATENTED JULY 7, 1908.
W. G. TEMPLETON.
WEIGHING SCALE.
APPLICATION FILED JUNE 8, 1907.

2 SHEETS—SHEET 1.

WITNESSES: William G. Templeton, INVENTOR
By C. A. Snow & Co.
ATTORNEYS

No. 892,773. PATENTED JULY 7, 1908.
W. G. TEMPLETON.
WEIGHING SCALE.
APPLICATION FILED JUNE 8, 1907.
2 SHEETS—SHEET 2.
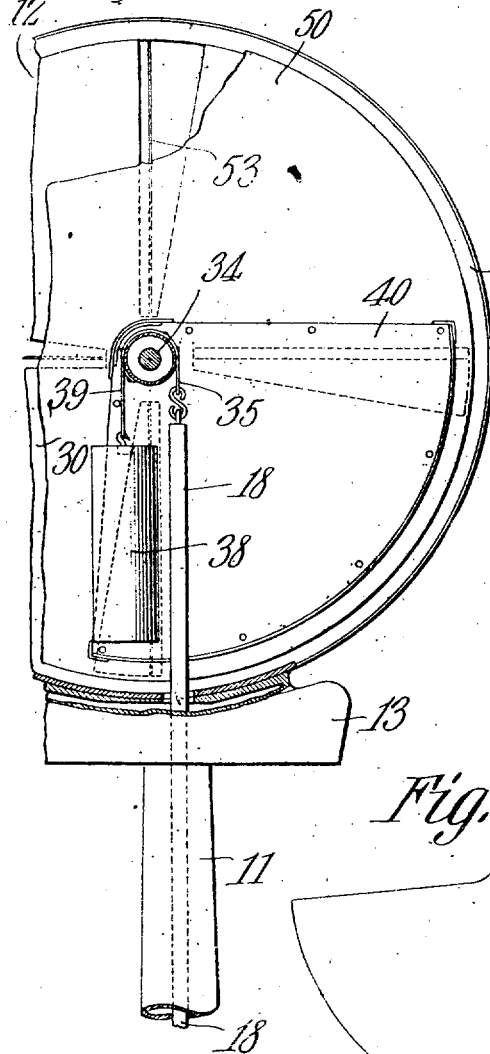
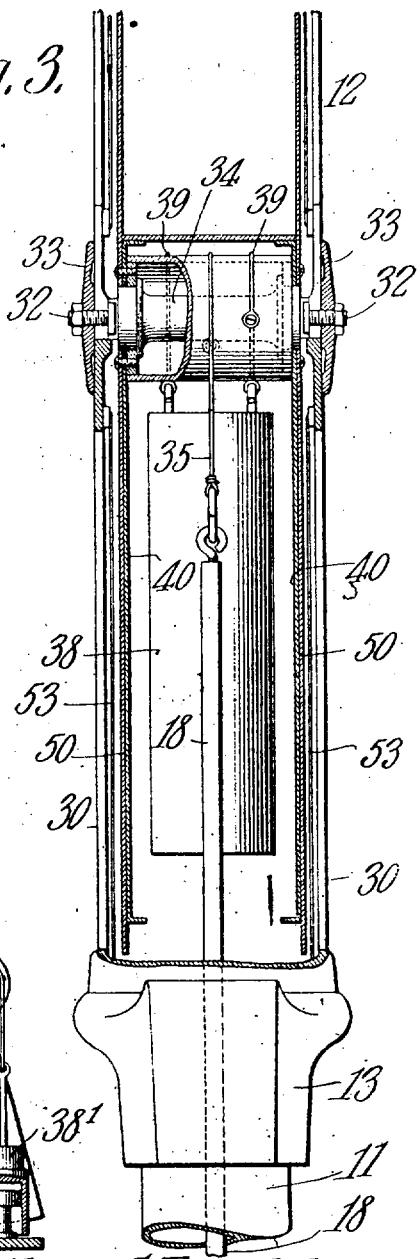
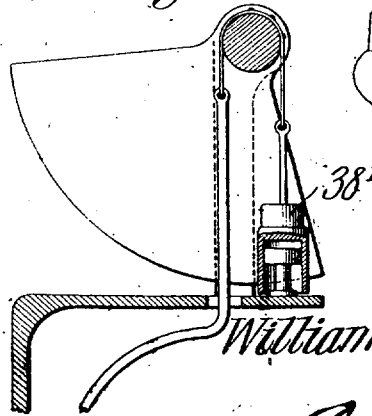
WITNESSES
William G. Templeton,
INVENTOR.
By C. A. Snow & Co.
ATTORNEYS

UNITED STATES PATENT OFFICE.

WILLIAM G. TEMPLETON, OF COLORADO SPRINGS, COLORADO.

WEIGHING-SCALE.

No. 892,773.  Specification of Letters Patent.  Patented July 7, 1908.

Application filed June 8, 1907. Serial No. 377,947.

*To all whom it may concern:*

Be it known that I, WILLIAM G. TEMPLETON, a citizen of the United States, residing at Colorado Springs, in the county of El Paso and State of Colorado, have invented a new and useful Weighing-Scale, of which the following is a specification.

This invention relates to weighing scales, and has for its principal object to provide a novel form of scale in which provision is made for correctly indicating different weights and for calculating the values of materials weighed, the scale being so arranged that a very large number of unit values may be employed.

A further object of the invention is to provide a scale of simple construction in which a plural indicating means is employed for the purpose of increasing the number of rate and value tables, or for the purpose of indicating weights and values in accordance with different standards, as, for instance, a scale for druggists' use may be made to indicate weights in accordance with apothecaries, troy, or avoirdupois standards, and one set of tables may, if desired, be employed in connection with tables indicating rates of postage.

A still further object of the invention is to provide a scale having an indicating disk bearing a plurality of separate indicating tables which are arranged to be viewed through a corresponding number of openings formed in the casing of the scale, there being a reading edge or wire at each opening, so that the weights or values at different points may be correctly ascertained.

A still further object of the invention is to provide a novel form of scale in which the indicating disk is carried by or is operated from a counter-poise in the form of a segment, the segment serving to resist the downward movement of the load receiver under the weight of a load and the counter-balancing effect being to some extent opposed by an auxiliary weight or counter-poise.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a weighing scale constructed in accordance with the invention. Fig. 2 is a vertical section of the interior of the scale showing the counter-poise in a different position. Fig. 3 is a transverse sectional view on an enlarged scale of the indicating mechanism. Fig. 4 is a sectional elevation, illustrating a modification.

Similar numerals of reference are employed to indicate corresponding parts throughout the several figures of the drawings.

The frame of the scale includes a base 10, a column 11, a circular casing 12, and an intermediate casing 13, all of which may be constructed and arranged in any suitable manner.

In the present instance the load receiving platform 15 is carried by a vertically arranged rod 16 that is supported by a frame 17, the rear end of which is permanently secured to the lower end of the tension or suspension rod 18 which connects with the indicating mechanism. In order to prevent swaying of the platform during the weighing movement, the lower forward portion of the frame is provided with a knife edge 20 between which and a rigid knife edge 21 is arranged a link structure 22 which is subjected to compression strain during the weighing operation, and which serves to hold the platform from lateral sway while in operation.

In the intermediate casing 13 is arranged a parallel motion device 24 which may be of any suitable construction and is employed for the purpose of maintaining the suspension rod 18 in a vertical plane.

The upper casing 12 includes a pair of circular disks 30 the central portions of which are secured to a drum 34 which may be of any desired construction, and this drum is arranged to be revolved from the suspension rod in any suitable manner. In the preferred construction a flexible member 35 that may be in the form of a chain, cord, or strap is attached at one end to the drum and is wound partly around the same, and its opposite end is connected to the suspension rod 18 of the scale, so that any downward movement of the suspension rod will serve to transmit rotative movement to the drum.

The downward movement of the suspension rod 18 under the influence of its own weight added to that of the platform and the other associated parts of the scale is counterbalanced, or more than counter-balanced by a weight 38 that is connected by a pair of flexible members 39 to the drum, these members being wound around the drum as the member 35 is unwound therefrom, and vice versa.

The counter-poise in the present instance is in the form of a segment or segments 40 which are preferably formed of metal and are rigidly secured to the opposite ends of the drum. These segments are approximately in the form of quadrants and when there is no load on the platform the segments normally assume the positions shown in Fig. 2, so that the greater weight of the segment is thrown to the right of the vertical plane of the axis of the drum, and the weight of the segment therefore tends to force the load receiver downward, but this downward movement is prevented and a state of equilibrium is established by the counter-weight 38 before described.

The effect of throwing the whole of the counter-poise to the right is to increase the capacity of the scale beyond that which it would have if the center of gravity of the counter-poise were allowed to normally remain in the vertical plane of the axis of the drum.

In some cases the auxiliary counter-weight may be of the construction shown in Fig. 4, wherein the weight 38' is in the form of an inverted cylinder which fits over a stationary piston carried by a part of the frame and constitutes a small dash-pot which will prevent abrupt movement of the load receiver in either direction.

Secured to the segments are indicating dials 50, there being two of such indicating dials shown in the present instance in connection with the two segmental counter-weights, although only a single counter-weight and single dial may be used in some cases.

Inasmuch as the full extent of weighing movement of the dial is limited to a quarter of a revolution in the present instance, each dial is provided with four different sets of weight indicating graduations which are exposed at four different display openings 52, and across these openings extend reading wires 53 that are arranged on lines radiating from the axis of the drum and dials. As the weight indicating graduations of the dial move past these reading edges the correct weight may be read at any one of the four points, and advantage may be taken of this by making the graduations in accordance with different scales, as, for instance, apothecaries, troy or avoirdupois.

One of the principal advantages to be derived from the plurality of indicating points, however, is that it permits of the employment of the scale as a calculating device of much wider range than scales which have only a single indicator, it being possible to employ about four times the number of unitary values opposite the dial and a correspondingly increased number of total values on the dial proper at points in radial alinement with the weight indicating graduations.

While the counterpoise and dial carrying member has been termed a drum for convenience, it is to be understood that a shaft, spindle, or other equivalent rotatable member may be substituted therefor without departing from the invention.

I claim:—

1. In a weighing scale, a drum, a load receiver, a flexible member having one end connected to the load receiver, and the opposite end to the drum, a segmental counterpoise carried by the drum, an auxiliary counter-weight also connected to the drum and tending to resist downward movement of the load receiver, a dial member carried by the segmental counterpoise and provided with a plurality of sets of weight indicating graduations, and a cover or casing within which the dial member is located, said cover or casing having a plurality of radially arranged openings through which the graduations are independently exposed.

2. In a weighing scale, a revoluble drum, a load receiver having a flexible connection therewith, a counter-weight tending to resist downward movement of the load receiver, said counter-weight having a flexible connection with the drum, a segmental counter-poise carried by the drum, the center of gravity of the counter-poise being normally held to one side of the vertical plane of the drum axis by the counter-weight, and a graduated dial revoluble with the drum.

3. In a weighing scale, a revoluble drum, a load receiver having a flexible connection with the drum, a segmental counter-poise connected to the drum, an auxiliary counter-weight having a flexible connection with the drum and acting to resist downward movement of the load receiver and to normally maintain the center of gravity of the counter-poise to one side of the vertical plane of the axis of the drum, and an indicating dial secured to and movable with the segment, said dial being provided with a plurality of sets of weight indicating graduations.

In testimony that I claim the foregoing as my own, I have hereto affixed my signature in the presence of two witnesses.

WILLIAM G. TEMPLETON.

Witnesses:
E. HUME TALBERT,
JNO. E. PARKER.